United States Patent
Tal et al.

(10) Patent No.: US 8,374,323 B2
(45) Date of Patent: Feb. 12, 2013

(54) AVAILABILITY NOTIFICATION SYSTEM WITH INTER-NETWORK CAPABILITIES

(75) Inventors: Oren Tal, Tel-Aviv (IL); Reuven Tal, Tel Aviv (IL)

(73) Assignee: ON-Q Telecom Systems Co., Inc., Cheyenne, WY (US)

(*) Notice: Subject to any disclaimer, the term of this patent is extended or adjusted under 35 U.S.C. 154(b) by 316 days.

(21) Appl. No.: 12/839,211

(22) Filed: Jul. 19, 2010

(65) Prior Publication Data
US 2011/0228924 A1 Sep. 22, 2011

Related U.S. Application Data

(60) Provisional application No. 61/315,076, filed on Mar. 18, 2010.

(51) Int. Cl.
*H04M 11/00* (2006.01)
(52) U.S. Cl. ......... 379/100.06; 379/88.12; 379/144.07; 379/88.2; 379/88.21; 379/88.19; 379/207.13; 379/207.14; 379/207.15
(58) Field of Classification Search ............ 379/207.06; 455/466, 417, 422.1, 414.1
See application file for complete search history.

(56) References Cited

U.S. PATENT DOCUMENTS

| | | | |
|---|---|---|---|
| 6,058,303 | A | 5/2000 | Astrom et al. |
| 6,215,782 | B1 | 4/2001 | Buskens et al. |
| 6,246,872 | B1 | 6/2001 | Lee et al. |
| 6,343,216 | B1 | 1/2002 | Kim et al. |
| 6,804,509 | B1 | 10/2004 | Okon et al. |
| 7,130,619 | B2 | 10/2006 | Florky et al. |
| 7,515,904 | B2 | 4/2009 | Okon et al. |
| 2003/0112948 | A1 | 6/2003 | Brown et al. |
| 2005/0043022 | A1 | 2/2005 | Okon et al. |
| 2007/0047695 | A1 | 3/2007 | Tal et al. |
| 2007/0121852 | A1 | 5/2007 | Taylor et al. |
| 2007/0167165 | A1 | 7/2007 | Yang et al. |
| 2007/0202895 | A1 | 8/2007 | Benco et al. |
| 2009/0143050 | A1 | 6/2009 | Ignatin |
| 2009/0264123 | A1 | 10/2009 | Bhushan et al. |

FOREIGN PATENT DOCUMENTS

| | | |
|---|---|---|
| EP | 0871316 | 1/2005 |
| EP | 2107817 | 10/2009 |

*Primary Examiner* — Joseph J Nguyen
(74) *Attorney, Agent, or Firm* — Leason Ellis LLP (57) ABSTRACT

In a communication system comprising multiple networks, a system is provided for notifying a caller that a call destination who was initially unavailable is now available, involving subscribers of possibly different networks. The system, when installed in a network, can support destination availability notifications following failed call attempts in which at least one user is a user of the network, regardless to which network the other user subscribes.

10 Claims, 8 Drawing Sheets

AVAILABILITY NOTIFICATION SYSTEM WITH INTER-NETWORK CAPABILITIES

This application claims the benefit of priority from U.S. Provisional Application Ser. No. 61/315,076, filed on Mar. 18, 2010, entitled "Inter-Network Reconnection System," which is hereby incorporated by reference as if set forth in its entirety herein.

FIELD OF THE INVENTION

The present invention relates to communication systems and, more particularly, relates to notification systems and methods configured to inform a caller that a call destination who was initially unavailable is now available, including among subscribers of potentially different networks.

BACKGROUND OF THE INVENTION

Terminology

Modern mobile communication systems include a vast variety of technologies and standards such as cellular systems, WiFi, WiMax, and more. Even within the cellular systems family different standards exist such as GSM, CDMA, TDMA, IDEN, etc. These systems and technologies are generally used to transfer two types of content—voice and data. The introduction of technologies such as voice over internet protocol (VOIP), in which both voice and data are transferred in packets, contributes to the delineation of voice and data transfer.

A basic element in every communication network is a dynamic database holding the current attributes of each terminal in the network, such as its availability, its location, its settings and preferences, etc. This database may be located in one physical machine or alternatively distributed across the network. In traditional cellular networks, HLR (Home Location Register) is the database holding the attributes of the network's own subscribers. In advanced communication networks, other types of databases and architectures may be utilized for keeping track of dynamic attributes of users that are registered or even just recognized by the network. For brevity and clearness, the descriptions hereinafter will use the traditional term "HLR" but it is to be understood that this term represents the much broader entities as described herein.

In addition, the convergence of the aforementioned technologies sometimes allows interoperability between technologies—for example, one side of a call can be e.g., a cellular terminal and the other e.g., a WiFi terminal. To make things more complicated, "hybrid" devices have been introduced that enable communicating between two mobile devices supporting two or more technologies, with an ability to transfer between communication technologies even in the course of a call. Therefore, what has traditionally been referred to as a "call" between two or more users using a wireline and/or mobile devices can presently be referred to as the much broader term of "communication session". Accordingly, the traditional act of "calling" can now be referred to as the much broader "attempt to set-up a communication session". For brevity and clearness, the descriptions hereinafter will use the traditional terms of "call", "calling", "caller", "destination" etc. but it is to be understood that these terms represent the much broader entities as described herein.

According to the same line of logic, the traditional SMS message that was until not long ago an essentially sole method of transferring data between mobile devices has evolved into a vast variety of messages such as Multi-Media Messages (MMS), instant messages (IM), etc. In another example, data is delivered by a call that goes out to destination and plays a recorded audio sign or statement. For brevity, the descriptions that follow will use the term "SMS" and this term is to be understood as a message in its broadest sense as elaborated herein, including the evolved incarnations noted above and that generally are part of a message service, whether or not an "SMS" in the traditional sense. Messages sent within certain types of messaging systems can be configured to trigger, when delivered at recipient's mobile device, a report informing the delivery and sometimes the time of delivery, which is sent back to the entity that had sent the message (human or other). This type of report will be hereinafter referred to as a "delivery report".

The terms "availability notification" will be hereinafter used interchangeably to denote a message sent to a caller informing him/her of a high chance to connect to a destination and/or urging caller to do so as soon as possible. At certain occasions, the terminal state when message is displayed enables a "shortcut" procedure of dialing to second user, e.g. by a one-touch or two-touch dialing. As the dialing interface is simple and the connection is very likely to happen, this "notification" is just a bit short of actual connection.

Hundreds of mobile operators exist around the world. Each operator operates its own communication equipment and infrastructure for supporting mobile communication of its subscribers. For a single operator, all these will be collectively referred to as a "network" entity. Noticeably, a network can combine two or more technologies, such as a cellular network combining CDMA and IDEN technologies. A call between users of two different operators will be hereinafter referred to as an "internetwork" call. Industry standards allow standard actions such as a call, an SMS, an instant message, etc. to be performed between users of different operators, or "interoperator".

For a connection to be established between two terminals, a "call setup attempt" procedure has to take place. This typically commences with first user initiating a "call setup request" on his/her terminal. This request propagates from user's terminal to the serving network, and from there on to second user's serving network and, if possible, to second user's terminal. Second user can then decide whether to approve the call setup. In case second destination approves, each network allocates certain resources at serving switches, serving base stations, etc. that enable carrying-out the call—such as voice trunks, signaling resources, resources, etc. When the resource allocation procedure is successful in both networks then a call is established and users can commence the conversation. It should be understood that in each network, resources allocated for a call are deducted from pools of respective resources available at the network, reducing the number of other connections can be supported at any given instance. When a call terminates, at both networks a "call tear-down" procedure takes place which releases these resource to their respective pools.

It is a common occurrence for one individual to try to reach another individual on the phone but be unable to get through, i.e., progress to the point at which the destination terminal is ringing. In general, a caller's attempt to set up a call with a call destination fails when the destination is initially unavailable.

Various systems have been implemented to address this situation. For example, some phone service providers offer services such as "Call Parking" wherein when a busy signal is reached, the caller can request that the telephone system monitor the busy status of the destination and then inform the caller when the line is free.

While suitable for wired telephone systems, conventional call parking applications do not address the problems of unavailability when the destination is a cellular telephone. Thus, even if the system determines that a destination number is no longer busy, the system does not know why. As a result, the caller can be informed that the destination is idle, only to find that even though the destination is no longer busy, the destination is unavailable because, for example, the destination is out of range, the terminal has been turned off, or there is insufficient capacity in the cell to establish the connection.

Inter-Network Capabilities

In general the methods known in the art of availability notification of unavailable users is that these methods only support connection of calls in which unavailable user is in the network in which the service is implemented (i.e., only completion of incomplete incoming calls to the network). Only for destinations in GSM networks there is a method of determining destination availability based on a dummy-SMS, as described in U.S. Pat. No. 6,058,303 to Angstrom et al. For destinations in other than GSM networks, no method known in the art offers the service for cases in which unavailable user is outside the network in which service is implemented (i.e., for incomplete outgoing calls from the network, or disconnected on other network).

This shortcoming is a major barrier for proliferation of these services since, for inter-operator calls, it ironically provides a superior service for users outside the network in which it is installed, i.e., users of the other operator. These users are the ones that enjoy the enhanced service, namely, the users attempting to call from another the network rather than users attemting to call to another network. Unfortunately for the network in which such service is installed (for example the RingMe service at the Wind cellular company in Italy) users belonging to the network enjoy these types of services only for intra-network calls. This substantial limitation provides little incentive for operators to install these services at their networks.

Accordingly, it would be an improvement in the art to facilitate the completion of incomplete call attempts involving subscribers of possibly different operators. The present invention addresses one or more of these issues, in part, by providing a system for notifying callers that a call destination who was initially unavailable is now available and therefore an incomplete call attempt can be completed. The system, when installed in a network, can support connection of incomplete call attempts in which at least one user is a user of the network. Advantageously, both users involved in the failed call attempt can be given an option to connect the call. The present invention is directed to addressing these needs.

SUMMARY OF THE INVENTION

In accordance with one aspect of the present invention, a method is provided for notifying a caller that a call destination who was initially unavailable is now available, comprising detecting that the caller's attempt to set-up a call with the call destination has failed using an availability notification system (ANS) connected to a network associated with at least one of the caller and destination, the ANS having a detection task module executing a detection task on a processor thereof and operative to receive the number identifications of the caller and the destination, receive a release message associated with the call attempt, said call release message originating in an MSC of the destination's network, the release message including one or more cause-indicators, and test the cause-indicator parsed from the release message to determine a match to a prescribed criterion; and in the event of the match, executing a notification task within the ANS to at least one of caller and destination using a notification task module, wherein the notification task operates so as to periodically assess the availability of the destination using data provided over the network for a predefined time limit until the destination becomes available and wherein, if the destination is assessed to have become available within the predefined time limit, the notification task performs the additional step at the ANS of sending at least one of the caller and the destination a notification that a call can be established.

In accordance with another aspect of the present invention, a system is provided for notifying a caller that a call destination on a communication network that was initially unavailable is now available, comprising a computer having a memory and a processor for executing modules therein, the computer being in communication with the communication network, a database, a detection task module loaded into the memory of the computer and executing at least one detection task in the processor, the detection task configuring the processor to cause the computer to load into the memory number identifications of the caller and the call destination which are provided by the communication network, load into the memory a release message associated with a call attempt by the caller to the call destination, which is provided by the communication network, wherein the release message includes one or more cause-indicators, and test the cause-indicator to determine a match to a prescribed criterion stored in the database, a notification task module loaded into the memory of the computer and executing at least one notification task in the processor in response to the test by the detection task returning the match, the notification task configuring the processor to cause the computer to periodically assess the availability of the call destination using data provided over the communication network for a predefined time limit until the call destination becomes available, wherein if the call destination is assessed to have become available within the predefined time limit, the notification task is further operative to send at least one of the caller and the call destination a notification that a call can be established; and a task manager loaded into the memory of the computer and executing in the processor so as to configure the processor to monitor the execution of up to a multiplicity of detection tasks and notification tasks.

These and other aspects, features, and advantages of the present invention, some of which are detailed in the claims attached hereto, can be further appreciated from the following discussion of certain embodiments of the invention taken together with the drawing figures that illustrate the embodiments thereof.

DETAILED DESCRIPTION OF CERTAIN EMBODIMENTS OF THE INVENTION

1) Introduction and Overview a) General

In accordance with one aspect of the invention, a system and method for facilitating completion of incomplete call attempts between possibly different operators is provided. The system subject of the present invention is generally denoted as ANS—Availability Notification System. It should be understood that that term is only a convenient abbreviation. The ANS is implemented on a computer having a memory and a database for executing modules therein, the computer being in communication with the communication network. The ANS provides users availability notification cues at the earliest possible time, allowing both users to make a call to each other if and when desired.

The ANS provides users a notification that a previously unavailable destination is now available, and also offers users a convenient method for initiating a new call soon after it is possible to do so. The combination of notification and offer for call re-establishment is hereinafter denoted "connection cue". Users can then opt to accept the connection cue if they desire to connect the call.

The ANS is activated after a failed call attempt from caller (hereinafter referred to as user C) to destination (hereinafter referred to as user D). The ANS supports the service for both incoming calls and outgoing calls to and from the network in which it is installed. Therefore, it is substantially superior to similar systems known in the art, such as the RingMe service installed at the Wind operator in Italy and the NotifyMe service offered by Comverse installed at several operators worldwide, which support the service only for incoming calls (i.e., calls received at the network in which system is installed), and not for outgoing calls.

For each incomplete call, the ANS service flow can be roughly divided into three stages: detecting the incomplete call, triggering an availability notification task, and carrying out the availability notification task.

b) Detection

For availability notification following a failed call attempt, the very event of a failed call attempt has first to be detected. Detecting that the caller's attempt to set-up a call with the call destination has failed can be performed as a task as in an availability notification system (ANS) connected to a network associated with at least one of the parties to the call. The ANS has a detection task module executing a detection task on a processor thereof and operative to receive the number identification of the caller and the destination, receive a release message associated with the call attempt, parse the release message in a machine executing on the ANS to obtain the cause indicator, as explained hereinon, test the cause-indicator parsed from the release message to determine a match to a prescribed criterion, and in the event of a match, to execute a notification task.

The ANS is configured to receive all release messages for all calls involving at least one subscriber of said network.

The ANS receives these messages which include information originating from user D's serving MSC. Release messages typically progress on the signaling path between MSC's, and provide indications from one MSC to another that, e.g., an active call has been terminated or that a call set-up attempt has been unsuccessful.

Release messages typically include one or more cause-indicators, or clearing codes. These indicators traditionally serve as a useful debugging tool for tracking and analyzing network malfunctions and singularities. One of the focal points of the present invention is exploiting these indicators for detecting incomplete call attempts. An example of the cause indicator codes is the ISDN Event cause Codes, also known as Bellcore Standard ISDN cause Codes or SS7 cause Codes. These codes are associated with the Q.931 Standard.

In one example of the aforementioned standard, cause indicator 17 when received from a destination's MSC signifies that the user which is called is busy. For this cause indicator, when received in the process of call set-up, it is typically desired to trigger the notification task so that caller will get an indication when destination's call is terminated. In contrast, cause 22 signifies that destination's number has changed. This cause indicator is returned to a calling user when the destination number indicated by the calling user is no longer assigned. The new destination number may optionally be included in the diagnostic field. When this cause indicator is received from a destination's MSC in the process of call setup, there is obviously no point in triggering the notification task.

In a further example, cause indicator 38 signifies that a network out of order. This cause indicates that destination's network is not functioning correctly and that this condition is likely to last a relatively long period of time. In this case, activating the notification task is not likely to be successful. In a further example, cause indicator No. 41 signifies temporary failure. This cause indicator indicates that the network is not functioning correctly and that the condition is not likely to last a long period of time. In this case, activating the notification task may be desired.

In yet a further example, cause indicator 42 signifies switching equipment congestion. This cause indicates that the switching equipment generating this cause is experiencing a period of high traffic. In yet a further example, cause indicator number 21 signifies call rejected. This cause indicates that the equipment sending this cause does not wish to accept this call, although it could have accepted the call because the equipment sending this cause is neither busy nor incompatible. In this case, it is preferable that the notification task not be triggered.

In yet a further example, cause indicator 18 signifies no user responding. This cause is used when a user does not respond to a call establishment message with either an alerting or connect indication within the prescribed period of time allocated (defined in Recommendation Q.931 by the expiry of either timer T303 or T310). In this case activating the notification task is desired.

A cause indicator code generated by a call setup request, following a dial attempt by caller C, can be tested by code executing to implement this embodiment versus values representing different causes for the call setup failure to determine whether the call setup failure is a result of destination D's unavailability. The detection task module, executing a detection task on a processor in the ANS, parses the release message in a machine executing the ANS to obtain the cause-indicator. The detection task further tests the cause-indicator parsed from the release message to determine if it corresponds to a prescribed criterion, i.e. a release code indicative of an incomplete call attempt that can be later connected (e.g., that the destination number is indeed valid).

In certain implementations, a system could give the user a choice of the preferred availability notification method, along with the idea of setting defaults for call completion services as described in the US Patent Application 20070047695 to Tal et al., titled "Method and System for Automated and Selective Determination of Call Completion Services", which is hereby incorporated by reference in its entirety.

c) Triggering

The notification task as described above can be triggered according to the present invention in various options. According to one embodiment, denoted "Automatic Triggering", after detecting a failed call attempt, the ANS system automatically triggers the notification task, i.e. without requesting consent of either user. This is the simplest option. However, in cases when notification is undesired for any of the users it does not enable users to avoid the triggering of the notification task.

In certain implementations, it may be desired to allow selective triggering of the notification based on user C and/or user D's consent. This consent can be obtained, e.g., by an additional task that accesses a database which contains data pertaining to users' preferences, e.g., whether they wish the availability notification task to be triggered automatically, with a prompt, or not at all. Furthermore, the database may include a subscriber table storing subscriber data of the caller and/or the destination. Another option is to allow user C to provide a case-by-case decision whether or not to trigger the notification task. The following embodiments of the present invention are of the latter type.

According to another embodiment, denoted "Offline IVR Triggering", after detecting a failed call attempt the ANS presents the notification offer to user C by dialing him/her and providing an IVR (Interactive Voice Response) interface. The IVR application introduces the ANS service and requests an approval on part of user C for triggering the notification task, such as pressing a key. If user C chooses to trigger the notification task, preferably the IVR application will issue a confirmation that the notification task had indeed been triggered According to another embodiment, denoted "CallerID-offered Triggering", after detecting a failed call attempt the ANS presents the notification offer to user C by dialing him/her with a pre-determined and preferably meaningful alphanumeric string displayed as the CallerID on his/her terminal (the string displayed when receiving an incoming call, typically displaying the number of the caller). This string indicates to user C that his/her answering the call would trigger a notification task of user D's availability. User C can then choose whether to answer or decline the call. If user C chooses to answer, preferably a voice message sounded to user C confirms that the notification task had indeed been triggered.

According to another embodiment, denoted "SMS-offered Triggering", after detecting a failed call attempt the ANS presents the notification offer to user C by sending him/her an SMS containing the notification offer. Preferably, the SMS provides a shortcut method (2-3 keystrokes) for user C to indicate his/her consent while still in the SMS reader application, such as: issuing a return SMS to the ANS, dialing a specified number, etc.

It is to be understood that any embodiment of the ANS according to the present invention is in fact a combination of a triggering method (or automatic triggering) and a notification methods.

d) Monitoring & Notification

A task for notification the caller and/or the destination of the availability of the destination executes within the ANS using a notification task module. Typically, the notification task operates as to periodically assess the availability of the destination using data provided over the network for a pre-defined time limit until the destination becomes available. Therefore, a core element in the process of notification according to the present invention is assessing availability of the users involved, following the failed call attempt.

Availability determination or assessing methods are extensively discussed in U.S. Pat. Nos. 6,804,509 and 7,515,904 to Okon et al. in the context of call completion to previously unavailable destination. In U.S. Pat. Nos. 6,804,509 and 7,515,904, registration based-methods were assessed as inferior to determining availability with a call handshake procedure. The fact of the matter is that when it comes to inter-network communication (which indeed is the case with a considerable percentage of the calls), none of these methods works unless monitoring modules are installed in both networks and the ANS is granted access to both systems. That requires a high level of integration and cooperation between the networks which is viewed as a hurdle in deploying the service. In contrast, the present invention enables monitoring the availability of users at possibly different networks avoiding the need for any integration or cooperation thereof.

Further, even when considering intra-network calls, U.S. Pat. Nos. 6,804,509 and 7,515,904 and many of the registration-based methods suffer of the limitation that they do not address many of the possible call failure situations, such as described in the SS7 cause indications mentioned above. Therefore, these patents are limited to "standard" situations such as "user busy" and "user unavailable" received from destination's MSC. In reality, however, there are situations where a call setup attempt fails due to many other reasons.

It should be noted that in some networks there is an option of sending and/or receiving a dummy SMS. A dummy SMS can serve as a silent availability check on a destination. This is in fact a virtual SMS that is sent to user, which stops short of actually reaching the recipient user but can deliver back to sender the acknowledgement message when message has been "delivered" (i.e. when user returned to availability). However, as this option exists only in certain networks, it cannot be relied on as a solution for a system that is required to operate with full inter-network operability. Specifically, if a user cannot be sure whether the service works for every destination, he/she might refrain from using it at all since the extra attention required to verify that the service indeed works would be counterproductive to the basic idea of making the connection more simple and user-friendly.

When destination is a subscriber of the ANS-installed network, another embodiment can be applied for monitoring destination's availability, According to this embodiment of the present invention denoted "HLR-based notification", the notification task begins with repeatedly querying destination's availability in a database such as an HLR (Home Location Register). Once destination is determined available, the ANS rings caller's terminal. Once caller answers he/she is offered by IVR to remain online for call connection. Only after first user remains online does the ANS dial to other user. Once the other user answers, both users are connected. In another version of the HLR-based notification embodiment, after destination is determined available the ANS sends caller an SMS, preferably providing a shortcut dial method to dial to destination.

A "notification lag" is defined as the period that passes between destination becoming available and the time caller is notified of this new status. For the HLR-based embodiment, this lag is determined by the sampling scheme utilized, e.g., by the ANS monitoring module or by the monitoring scheme applied in the SMSC which notifies the ANS of user's status. As sampling resources in a network are often scarce, an inherent tradeoff exists between minimizing the average number of HLR queries on one hand, and minimizing the average "notification lag" on the other. This tradeoff can be settled in different sampling schemes in which possibly varying querying frequency may be set to be based on the specific situation at hand. For example, causes indicator 17 that signifies "user busy" can be set to trigger a high-frequency query scheme, which poses little risk for network overload. In contrast, cause indicator 38 signifies a long-period network malfunction, in which a low-frequency query scheme may be preferred.

Another approach for confronting scarcity in resources can be applied, based on a previously-defined hierarchy or classification between users. US Patent Application 20070121852 to Taylor et al., titled "Method and System for User Prioritization within Telecommunication Services and in Particular within Call Completion Services", which is hereby incorporated by reference in its entirety, teaches a system and method for hierarchical prioritization and execution of call completion services. In accordance with this approach, within the present invention users can be classified as "high priority" and "regular priority", whereas high priority users are allocated more network resources, such as availability querying resources, than regular priority users. This means, e.g., that high priority users will enjoy a shorter average notification lag than regular users.

If by any of the methods described above the destination is assessed to have become available within at the predefined time limit, the notification task performs the additional step at the ANS of sending the caller and/or the destination a notification that the call can be established.

Figure 1A:
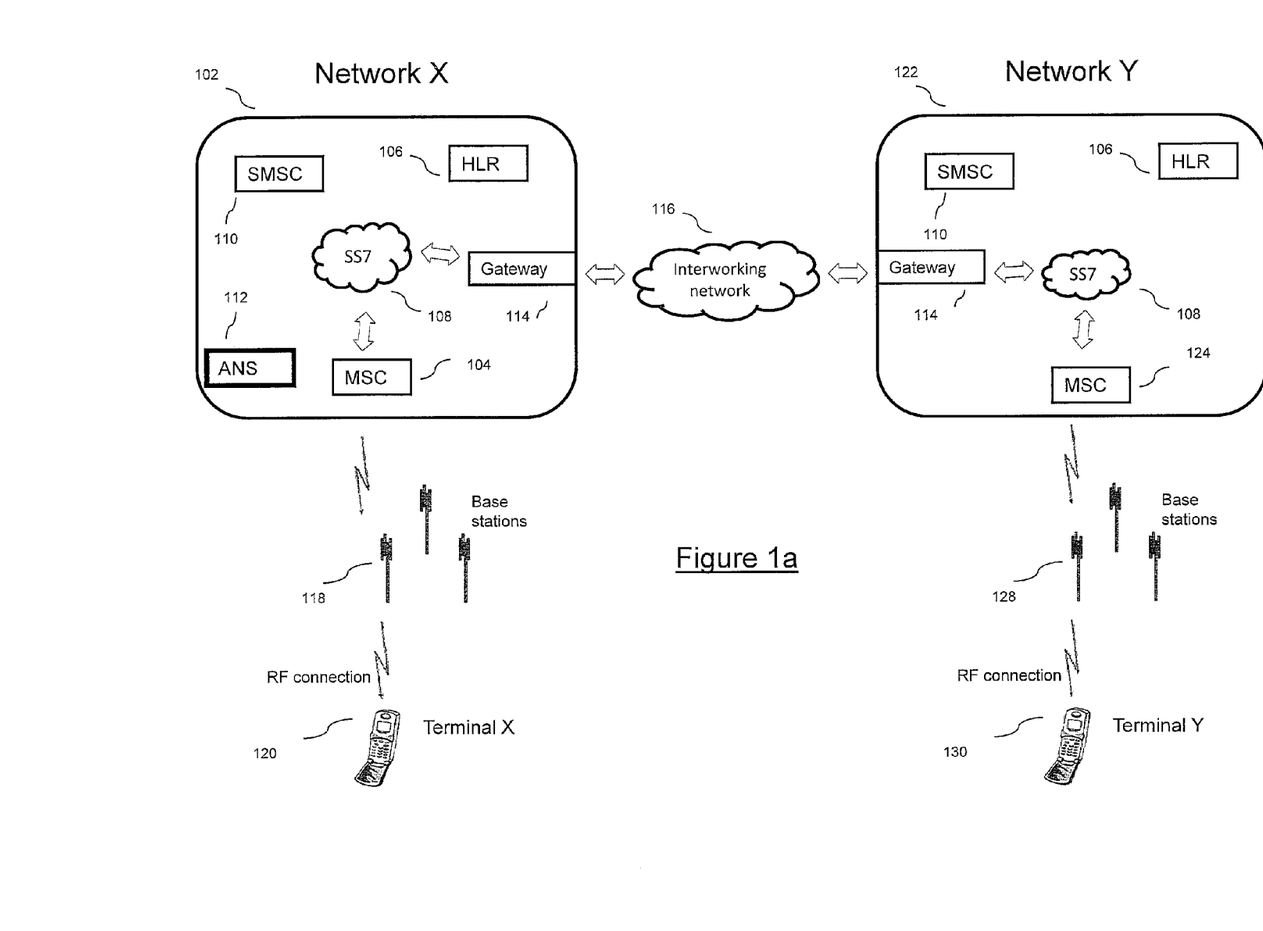
FIG. 1a provides a block-diagram description of an Availability Notification System (ANS) installed in a communication system and serving it.

FIG. 1*a* provides a schematic description of the high-level architecture of the cellular networks which are involved in the connection between terminals X and Y. It is assumed that the ANS is installed at Network X. Network X (102) serving terminal X (120) consists (among others) of the following entities: an SMS center denoted SMSC (110), an HLR (106), at least one mobile switch (MSC)(104), and a gateway switch (114). An ANS module (112) is introduced according to the present invention. It should be noted that though in FIG. 1*a* the ANS is presented as part of Network X, it can actually be implemented as hardware and/or code located outside the network.

These entities are physically interconnected and communicate with each other. The MSC serving terminal X communicates with its serving mobile base station (118). The mobile base station communicates with terminal X through an RF channel. Network X is connected through its gateway switch (114) to an internetworking network (116) through which it is connected to network Y (122) which is serving terminal Y (130). Network Y consists of basically the same elements as network X less the ANS which is not present in this network. The MSC serving terminal Y (124) communicates with the mobile base station (128) which communicates with terminal Y.

The arrangement of FIG. 1*a*, therefore, provides a description of the most general case when a communication session is established between a network which is provided with a ANS and a network which is not provided such system. As will be appreciated by persons of ordinary skill in the art, the blocks illustrated in FIG. 1*a* (and throughout the figures) can be implemented as modules that comprise code that, upon execution, configure a processor to perform the functions and interactions described herein.

e) Implementation

Figure 1B:
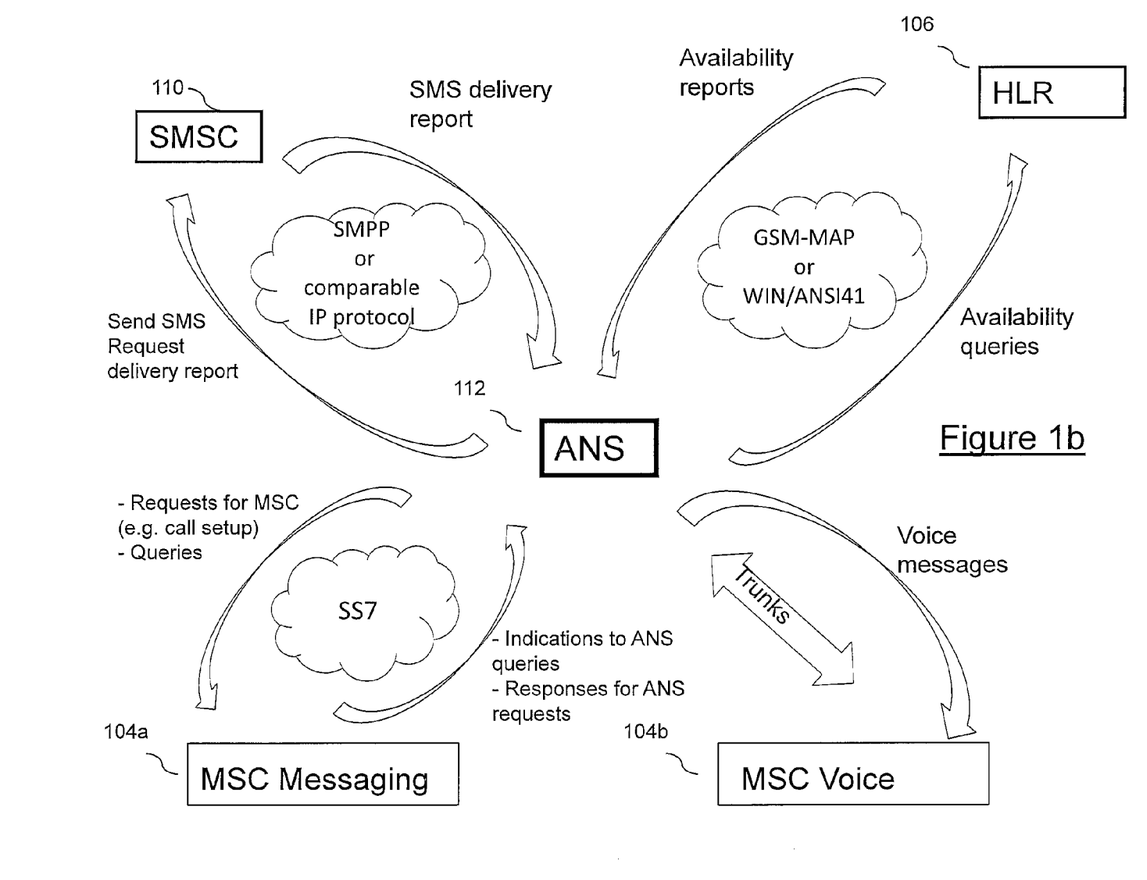
FIG. 1b provides a schematic description the connectivity of the ANS system with several important external modules.

FIG. 1*b* provides a schematic description the connectivity of the ANS system with several important network modules. The ANS (112) communication with the SMSC (110) is handled via SMPP or some other comparable IP protocol. Messages sent are requests for sending SMS, and messages received are delivery reports. The ANS communication with the HLR (106) is handled via GSM-MAP or WIN/ANSI41 protocol. The ANS issues availability queries to the HLR which are answered by availability reports. The ANS communication with the MSC signaling side (104*a*) is handled in ISUP/INAP via SS7 network, whereas different queries and requests are sent from the ANS to the MSC and indications and responses are sent back from the MSC to the ANS. Additionally, the ANS uses voice trunks to convey to the MSC voice side (104*b*) messages to be sounded to users.

Preferably, ANS signaling is based upon the INAP protocol. The Intelligent Network Application Part (INAP) is a signaling protocol used in the Intelligent Network architecture. Preferably, for CDMA/TMDA installations popular in North America, the ANS will use the WIN version (Wireless Intelligent Network). The INAP/WIN protocols will be used to monitor calls as they progress through the network, identify call attempt, and trigger the ANS's unique functionally if a failed call attempt from a caller to a destination has been detected. IS41 shall be used for accessing the HLR.

In another example, a protocol for GSM is called MAP (Mobile Application part). IS41 and MAP will be used for handling handoffs, SMS deliveries, and interactions with the HLR. ISUP (ISDN) user part will be used by Intelligent Peripherals (IP) in order to set up or release calls, as well as play voice prompts.

As for the specific hardware used for implementing the ANS, various configurations can be used depending heavily on the system requirements and the specific characteristics of the network in which it is implemented. By way of example, two such configurations are hereinafter described. (a) A series of stand-alone servers, e.g., HP Proliant 380G6 or equivalent Servers, which are NEBS compliant and provide High Performance in a 2U or 4U 19" rack-mount packaging. Each such server is fitted with either AudioCodes IPM260 8E1 cards for dealing with ISUP and Voice (i.e. prompts), or Ulticom SIGNALWARE boards and protocol stack, for INAP/WIN and TCAP. The actual number of cards depends on system load, realtime requirements, site characteristics, system design and performance. (b) A system based on a 19" Card cage that includes CPU blades. This form factor is often called COMPACT PCI, and is provide by vendors as e.g., HP, PTI and many others. The system also consists of audioCodes IPM260 16E1 BLADE, or the PTI 24E1. Additionally, Ulticom SIGNALWARE boards and protocol stack, for INAP/WIN and TCAP. Configuration (b) is far more useful for large single sites, and is also preferable for supporting high system performance.

For each failed call attempt, the ANS service is executed by two types of tasks—detection of failed call setup attempts tasks and notification tasks. In realtime systems which operate at a highly dynamic environment it is generally advantageous to implement an architecture in which a task manager monitors and controls the execution this multitude of tasks. The task manager will, e.g., spawn tasks according to predefined events, such as spawning detection tasks in the events of receiving failed call attempts from an MSC. In another example, the task manager utilizes a timer module to control the termination or abortion of outdated tasks, such as outdated monitoring tasks. The task manager can also be utilized to control the ANS performance at times of enhanced demand for call completion, such as in peak hours of network usage. The task manager can handle such situations by different schemes of dynamic resource allocations. For example, the task manager can trim the resources allocated for different tasks, e.g., by setting a lower sampling frequency in availability monitoring tasks. The task manager can test whether the database contains data representative of the approval of the caller and/or destination prior to the notification task being executed.

Each of the modules and other components that comprise the ANS, whether hardware or code, can be integrated within the MSC of a telephone service provider. Integration of the ANS can include co-location of the equipment or even installation of one or more of the modules on a server that operates the MSC or that is on the same local network as the MSC, for example, on the same LAN segment that has the MSC.

f) Concluding Comments Regarding Overview

One specific challenge of the connecting failed call attempts is handling cases when more than one user had called destination while he/she was unavailable. According to one embodiment, each incomplete call is handled separately as an independent task. While this approach is technically simple, the outcome is that when destination becomes available he/she might be "flooded" with several notifications, which might be a nuisance for him/her. According to another embodiment, even when numerous users had called him/her, user is sent only one message, which is not a connection cue but rather a notification that one or more users had called him/her while he/she was unavailable, and that they are now notified of his/her return to availability.

The role of this message is twofold: first, informing destination that several callers had called him/her while he/she was unavailable and are expected to call him/her shortly. Second, the message's delivery report serves as an indication that destination has become available and triggers (preferably gradual) connection cues to all callers.

It should be noted that the incomplete call embodiment as taught by the present invention would be implemented for all destinations (intra-network and inter-network). However, when it comes to intra-network functionality, other methods of availability determination as described in U.S. Pat. Nos. 6,804,509 and 7,515,904 could be applied. Therefore, one can envisage a "hybrid" method, combining one method for inter-network use and another method for intra-network use.

It should be understood that the aforementioned embodiments can comprise components or aspects of a system constructed in accordance with the present invention. As can be appreciated by one skilled in the art, the aforementioned embodiments can be combined with one another in various ways to produce more complex versions, which are still perceived as within the scope of the present invention.

2) Detailed Discussion of Certain Components and Embodiments

The system for completing incomplete call attempts can be installed in a cellular network, e.g., as a dedicated server or as a module added to existing servers used for performing other tasks. For brevity, this system will be hereafter referred to as ANS—Availabiliy Notification System.

Figure 2:
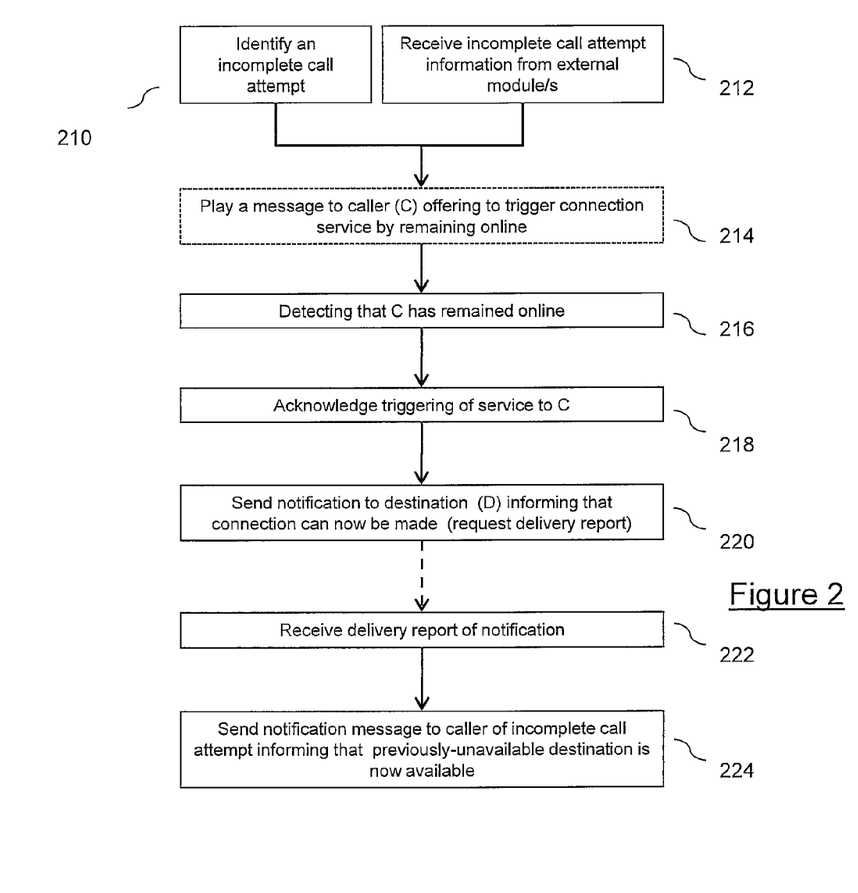
FIG. 2 provides a schematic description of the stages performed by the ANS according to the Immediate-IVR triggering, SMS notification embodiment.

The system for availability notification following incomplete call attempts can be installed in a cellular network, e.g., as a dedicated server or as a module added to existing servers used for performing other tasks. For brevity, this system will be hereafter referred to as ANS—Availability Notification service. FIG. 2 provides a schematic description of the stages performed by the ANS according to the Immediate-IVR triggered, SMS notification embodiment of the present invention. The various steps are hereby elaborated.

A failed call attempt can be identified e.g., by receiving cause indication 18—no user responding. Identification can be performed either by an external entity and then streamed to the system (step 212) and/or directly by the system itself (step 210), scanning a superset of call attempts. At either case, call attempt data such as users' numbers and identity of caller are input to the system. This stage is by itself not a focal point of the present invention, and therefore will just be mentioned (but not elaborated) in the embodiments that follow.

Immediately subsequent to the standard message announcing that user D is unavailable, i.e. while C is still online, the ANS sounds to C an offer for the availability notification service, in which C has to remain online for, e.g., 1-3 seconds after the offer to accept it (step 214). After detecting that C has remained online (step 216), an acknowledgement is sounded to C instructing him/her to hang up (step 218). A notification message is then sent to D (step 220). This message can be an SMS or any other message featuring an option of delivery report. This message has in fact two aims: first, it notifies D that he/she is back to availability and reminds him/her to return a call. Second, as this message is sent with a request for a delivery report, it is a means for monitoring unavailable user's availability. This means that the dedicated system server can be relieved of the availability monitoring function which is handed-out to an external system, possibly in another network, such as an SMS server already configured to monitor users' availability for its own purposes. The delivery report, handed back to the system once D receives the message (step 222), indicates to the ANS that D has become available. Then, the ANS notifies C that D is again available (step 224).

The advantage of handing-out the monitoring task to an external notification system is twofold: First, it enables offering the service in cases when D is not a subscriber of the network in which the ANS is installed. When D is in fact a subscriber of the network in which the ANS is installed, it simplifies the system substantially since it does not require it to be closely integrated with the HLR (Home Location Register) and possibly load it with multiple availability queries, but rather makes use of existing capabilities.

Figure 3:
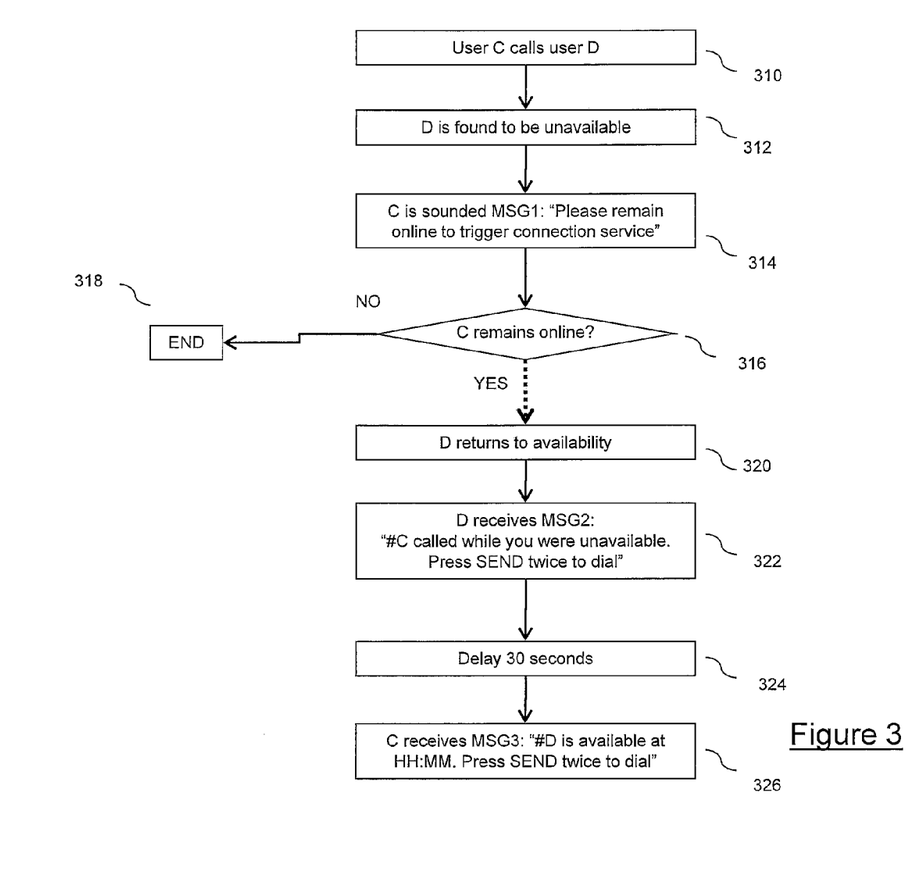
FIG. 3 provides an elaborate description of the ANS service-flow according to the Immediate-IVR triggering, SMS notification embodiment.

FIG. 3 provides an elaborate description of users' perspective of the Immediate-IVR triggered, SMS notification embodiment. User C is calling user D (step 310), when D is determined unavailable (step 312). This is the point at which the process according to the present embodiment begins: C hears a message MSG1 (step 314).

If (condition 316) C immediately hangs-up the task terminates (step 318). If C remains online for e.g., 1-3 seconds, the notification task is initiated. Immediately after D returns to availability (step 320), he/she receives a notification MSG2 (step 322). After a certain delay, e.g., 30 seconds (step 324), C receives a notification that D is now available (step 326). This delay is applied to reduce the chance that C and D will call each other at the same time, resulting in a busy signal. This is the point at which the process according to the present embodiment ends.

From then on, both C and D are aware that D is available and of the opportunity to complete the call, and are at liberty to complete the call at their convenient timing, if they so desire. To facilitate the dialing for C and/or D once an SMS is received, convenient shortcuts may be used. If, e.g., C's number is inserted into the text of the SMS sent to D, then D can call C with 2-3 keystrokes (such as SEND-SEND). This can be a user-friendly shortcut for either C or D for dialing. Other ways too can be used to dial the other user, such as the obvious ways of manually dialing or using the contact list.

Figure 4:
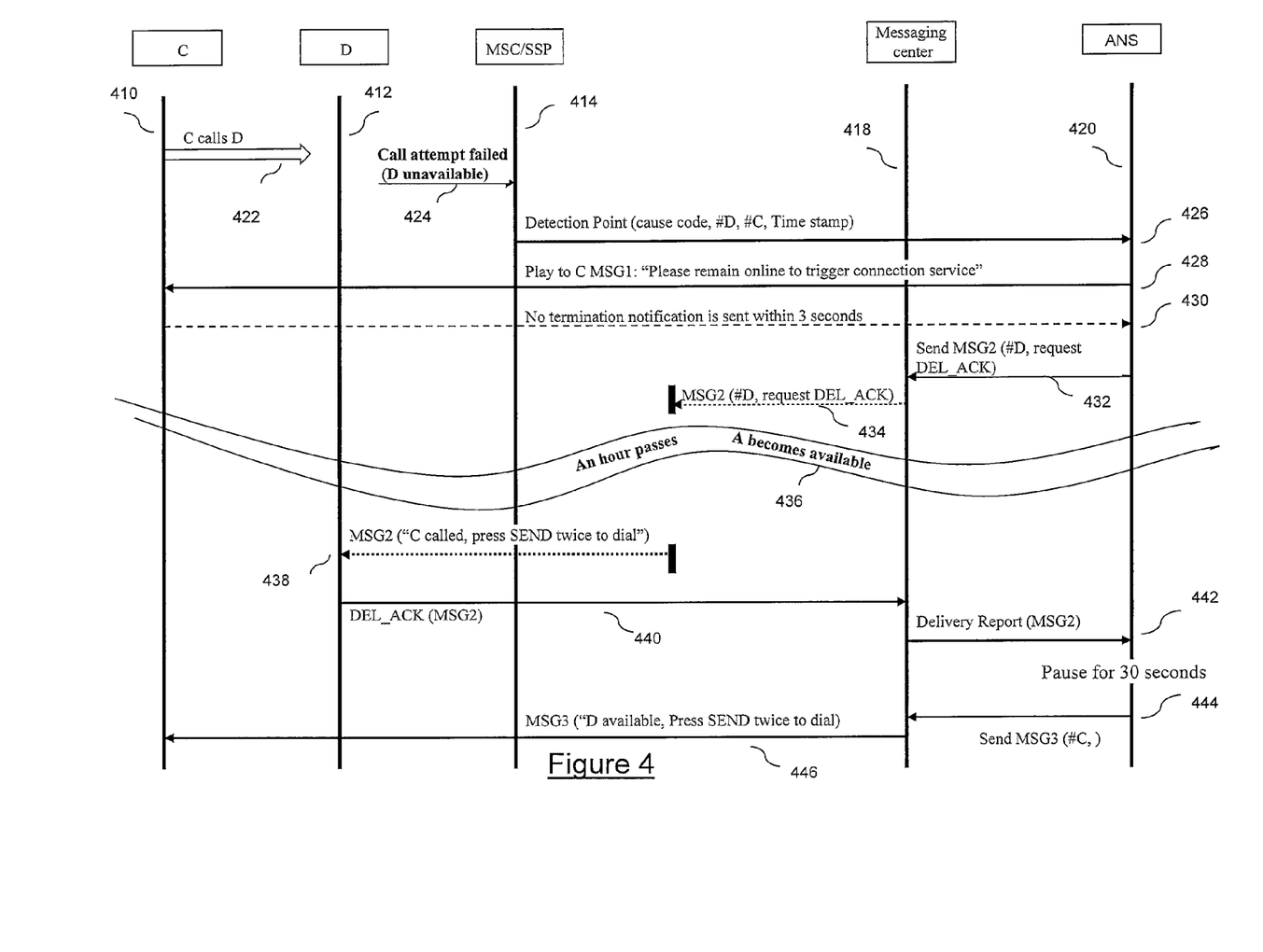
FIG. 4 provides a description of the signaling traffic between network entities according to the Immediate-IVR triggering, SMS notification embodiment.

FIG. 4 provides a schematic description of the signaling traffic between network entities following a failed call attempt according to the Immediate-IVR Triggering, SMS notification embodiment of the present invention. User C's (caller) terminal is denoted by vertical line 410, and so is user D's (destination) terminal 412. Users' C and D serving MSC/SSP of is collectively denoted by the vertical line 414. The messaging server of the network in which the ANS server is installed is denoted by vertical line 418. Finally, the ANS entity itself is denoted by vertical line 420.

Caller C attempts to call destination D (step 422) when the call attempt fails due to D's being unavailable. The occurrence is notified to the MSC/SSP of user D's serving network (step 424) and then a report is sent from the MSC/SSP to the ANS (step 426) with the following data concerning the incomplete call: the cause code, C's number, D's number, and the time of the call failure.

The ANS then immediately plays MSG1 to user C (step 428), and waits for a call termination notification (step 430). If no such termination occurs within, e.g., 1-3 seconds it means that C has accepted the offer. The ANS then sends Messaging center a request for sending a message MSG2 to user D with a delivery report request (step 432). Since D is unavailable, MSG2 can't be immediately delivered to him/her and thus waits for his/her return to availability (step 434).

At this point, the process pauses until D returns to availability. When D returns to availability after e.g., an hour (step 436), he/she is delivered the MSG2 that has awaited his return in his/her network's messaging center (step 438). A delivery acknowledgement of MSG2 is sent from D's terminal back to the messaging center (step 440), and then a delivery report of MSG2 is sent from the messaging center to the ANS entity (step 442).

The ANS entity then pauses for, e.g., 30 seconds and sends to messaging center a request for sending a message MSG3 to user C (step 444), and MSG3 is sent from messaging center to user C (step 446).

Figure 5:
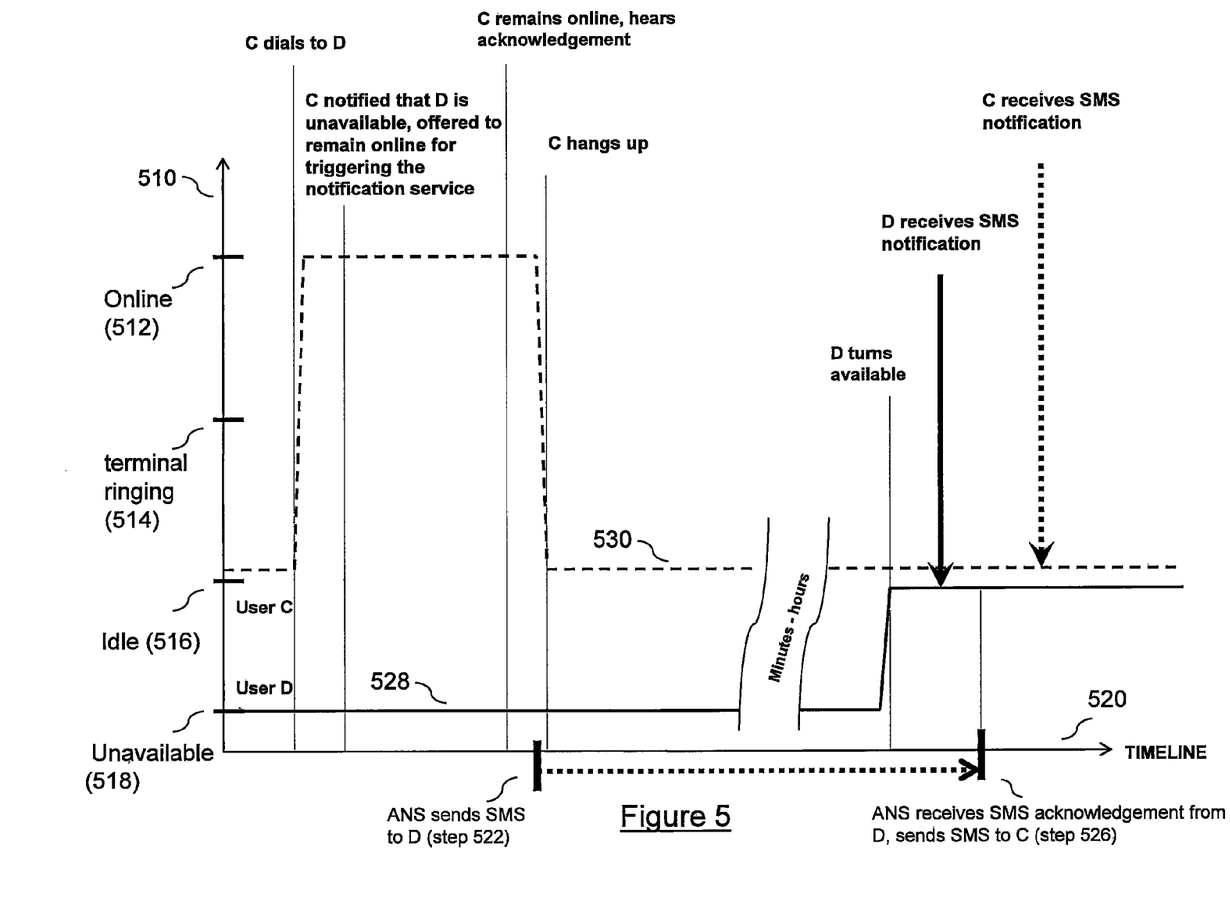
FIG. 5 provides an elaborate description of the timeline occurrences according to the Immediate-IVR triggering, SMS notification embodiment.

FIG. 5 provides an elaborate description of the timeline occurrences according to the Immediate-IVR triggered, SMS notification embodiment. The vertical axis (510) represents four states that a terminal can be in—unavailable (518), idle (i.e. available and not in use, 516), ringing state (514) and online (i.e. on an active call, 512). The horizontal axis (520) is a time axis. Terminal C is represented by a dotted line (530), and terminal D is represented by a continuous line (528). User C dials to user D, which is unavailable. User C is sounded a message that offers him/her to remain online for triggering the availability notification service. User C remains online, hears an acknowledgement of service triggering and then hangs up. In parallel, just after user C is acknowledged, the ANS is triggered. The ANS sends an SMS to used D (step 522) notifying him/her that user C has called him/her while he/she was unavailable. After a certain period of time, e.g., several minutes or even several hours, user D becomes available and shortly thereafter receives the SMS. Once the ANS receives the delivery report of the SMS, it sends an SMS to user C (step 526) notifying user C that user D is now available. Shortly thereafter, user C receives the SMS. At this point, both users are notified that a call can be made and are at liberty to dial each other if so desired.

Figure 6:
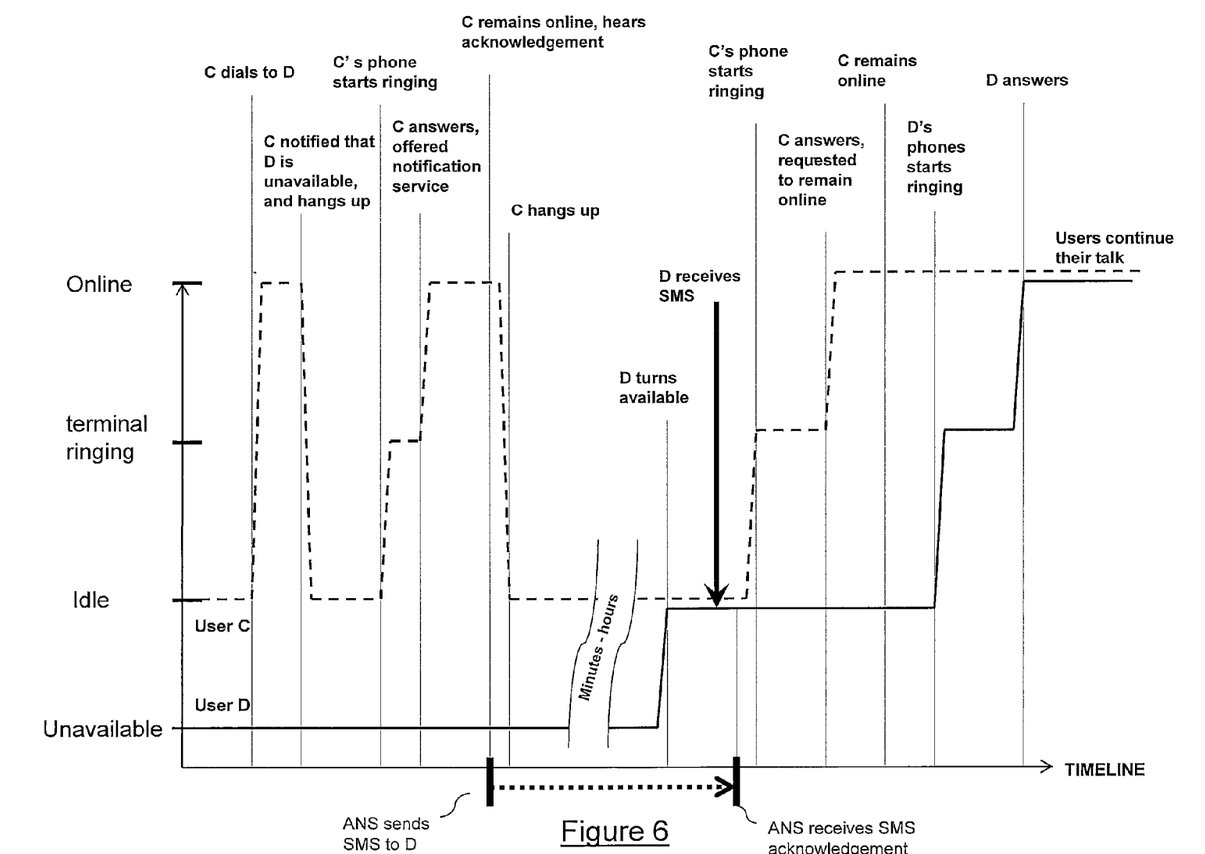
FIG. 6 provides an elaborate description of the timeline occurrences according to the Offline-IVR triggering, call notification embodiment.

FIG. 6 provides an elaborate description of the timeline occurrences according to the Offline-IVR triggered, call notification embodiment. This embodiment differs from the one depicted in FIG. 5 in the offering and triggering methods as well as in the notification method. In this embodiment, following a failed call attempt user C is not sounded a message (other than perhaps a standard "destination unavailable" message) and therefore immediately hangs up. Then, the ANS dials user C and once user C answers offers him/her the availability notification service. User C accepts the offer by remaining online, the ANS acknowledges user C of service triggering and sends an SMS to user D and. When user D becomes available, he/she receives the SMS notifying him/her that user C has called him/her while he/she was unavailable, and the ANS receives the message's delivery report, and then initiates a call to user C. Once user C is online and has accepted the connection offer, user D is called and brought online with used C. Notably, in this embodiment, the "availability notification" task is further extended to prompt and facilitate actual connection of users simply by answering the phone and remaining online (user C) and answering the phone (user D).

Figure 7:
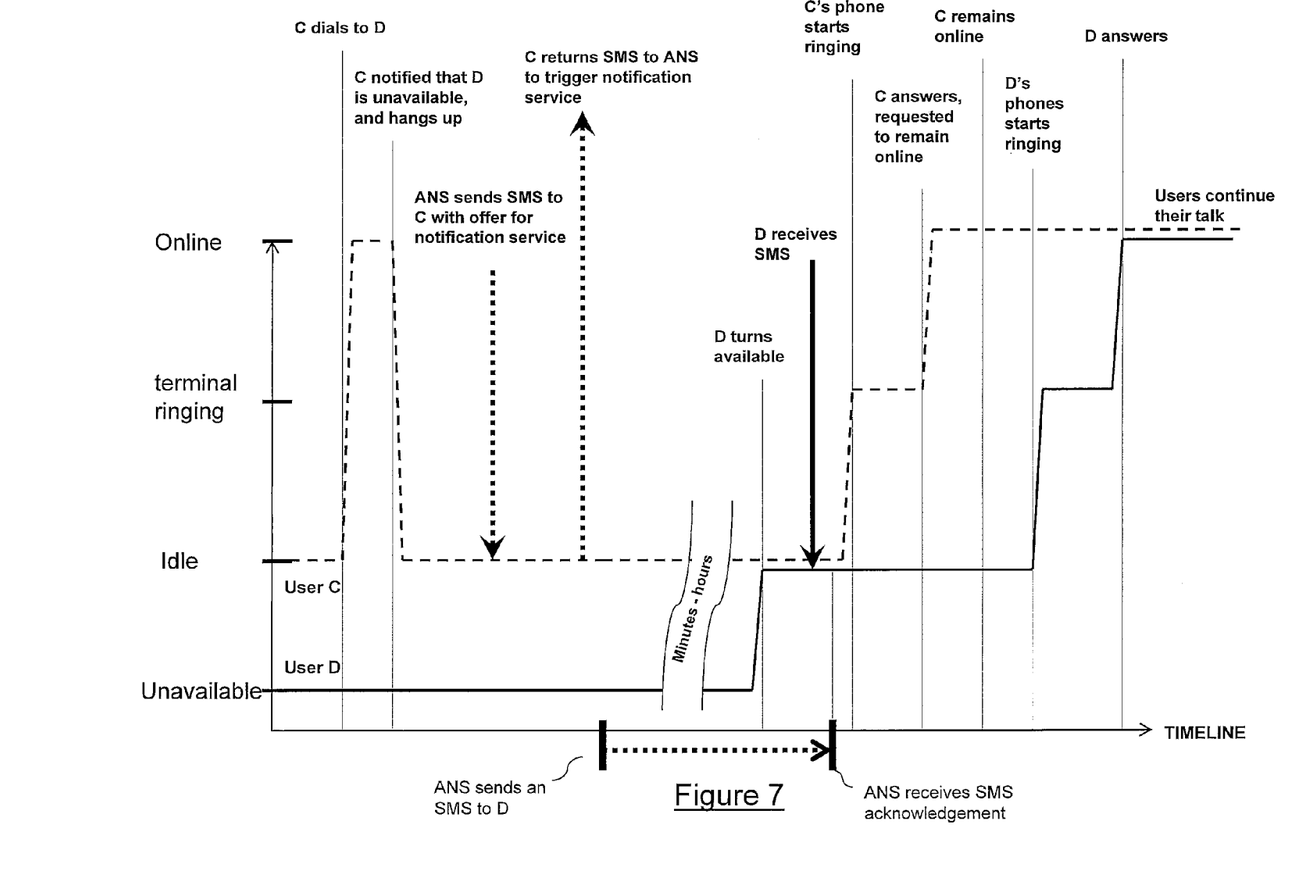
FIG. 7 provides an elaborate description of the timeline occurrences according to the SMS triggering, call notification embodiment.

FIG. 7 provides an elaborate description of the timeline occurrences according to the SMS triggered, call notification embodiment. This embodiment differs from the one described in FIG. 6 only in that the availability notification service is offered to user C by an SMS sent from the ANS and triggered by an SMS from user C to the ANS. In this embodiment too the notification task is extended to prompt and facilitate actual connection for user C.

While the invention has been described in connection with a certain embodiment thereof, the invention is not limited to the described embodiments but rather is more broadly defined by the recitations in the claims below and equivalents thereof.

We claim:

1. A method for notifying a caller that a call destination who was initially unavailable is now available, comprising the steps:
   a. detecting that the caller's attempt to set-up a call with the call destination has failed using an availability notification system (ANS) connected to a network associated with at least one of the caller and destination, the ANS having a detection task module executing a detection task on a processor thereof and operative to:
      1. receive the number identifications of the caller and the destination;
      2. receive a release message associated with the call attempt, said call release message originating in an MSC of the destination's network, the release message including one or more cause-indicators;
      3. test the cause-indicator in the received release message in a machine executing the ANS to determine a match to a prescribed criterion that is indicative of an incomplete call attempt that can be later connected; and
   b. in the event of the match, executing a notification task within the ANS to at least one of caller and destination using a notification task module;
      wherein the notification task operates so as to periodically assess the availability of the destination by sending a message to the destination and receiving an acknowledgement thereof for a predefined time limit,
      wherein the message is stopped short of reaching a terminal of the destination until the destination becomes available;
      wherein, if the destination is assessed to have become available within the predefined time limit, the notification task performs the additional step at the ANS of sending at least one of the caller and the destination a notification that a call can be established.

2. A method as in claim 1, wherein the notification task assesses the availability of the destination by querying an HLR of a network serving destination.

3. A method as in claim 1, wherein the caller and the destination are subscribers of the same network.

4. The method as in claim 1, wherein the caller and the destination are subscribers of different networks.

5. A system for notifying a caller that a call destination on a communication network that was initially unavailable is now available, comprising:
   (a) a computer having a memory and a processor for executing modules therein, the computer being in communication with the communication network;
   (b) a database;
   (c) a detection task module loaded into the memory of the computer and executing at least one detection task in the processor, the detection task configuring the processor to cause the computer to:
   i. load into the memory number identifications of the caller and the call destination which are provided by the communication network;
   ii. load into the memory a release message associated with a call attempt by the caller to the call destination, which is provided by the communication network, wherein the release message includes one or more cause-indicators;
   iii. test the cause-indicator in the received release message in a machine executing the ANS to determine a match to a prescribed criterion that is indicative of an incomplete call attempt that can be later connected; and
   (d) a notification task module loaded into the memory of the computer and executing at least one notification task in the processor in response to the test by the detection task returning the match, the notification task configuring the processor to cause the computer to:
   periodically assess the availability of the call destination by sending a message to the caller and receiving an acknowledgement thereof for a predefined time limit,
   wherein the message is stopped short of reaching a terminal of the destination until the call destination becomes available;
   wherein if the call destination is assessed to have become available within the predefined time limit, the notification task is further operative to send at least one of the caller and the call destination a notification that a call can be established; and
   (e) a task manager loaded into the memory of the computer and executing in the processor so as to configure the processor to monitor the execution of up to a multiplicity of detection tasks and notification tasks.

6. A system as in claim 5, wherein the task manager further configures the processor to launch the notification task on the condition that the system has access to data representative of an approval from at least one of the caller and the call destination to execute the notification task.

7. A system as in claim 6, wherein the task manager tests whether the database contains data representative of the approval of at least one of the caller and the call destination prior to the notification task being executed.

8. A system as in claim 5, wherein the database includes a subscriber table and wherein at least one of the caller and the call destination have subscriber data stored in the subscriber table.

9. A system as in claim 5, wherein assessing the availability of the caller is performed by querying an HLR of a network serving the caller.

10. A system as in claim 5, wherein assessing the availability of the caller is performed by sending a message to the caller and receiving an acknowledgement thereof.

* * * * *